(12) United States Patent
Chapman

(10) Patent No.: US 6,203,127 B1
(45) Date of Patent: Mar. 20, 2001

(54) TRACK ASSEMBLY FOR A WHEELED VEHICLE

(76) Inventor: Henry Chapman, P.O. Box 968, Milledgeville, GA (US) 31061

( * ) Notice: Subject to any disclaimer, the term of this patent is extended or adjusted under 35 U.S.C. 154(b) by 0 days.

(21) Appl. No.: 09/433,860

(22) Filed: Nov. 4, 1999

(51) Int. Cl.[7] ................................................. B62D 55/205
(52) U.S. Cl. ........................... 305/201; 305/114; 305/196
(58) Field of Search ................................. 305/111, 113, 305/114, 185, 193, 195, 196, 198, 200, 201

(56) References Cited

U.S. PATENT DOCUMENTS

| | | |
|---|---|---|
| 2,726,904 | 12/1955 | Bekker . |
| 3,497,271 * | 2/1970 | Keller .................................... 305/193 |
| 3,736,032 * | 5/1973 | Mosshart et al. ................. 305/195 X |
| 4,089,565 | 5/1978 | Loegering et al. . |
| 4,099,794 * | 7/1978 | Hoffart .................................. 305/113 |
| 4,176,887 | 12/1979 | Alpers et al. . |
| 5,058,963 | 10/1991 | Wiesner et al. . |
| 5,284,387 | 2/1994 | Loegering . |
| 5,429,429 * | 7/1995 | Loegering et al. .................. 305/193 |
| 5,616,193 | 4/1997 | Nordstrom et al. . |
| 5,951,124 | 9/1999 | Hoffart . |

* cited by examiner

Primary Examiner—Russell D. Stormer
(74) Attorney, Agent, or Firm—Richard C. Litman

(57) ABSTRACT

A track assembly for a skid steer type wheeled vehicle comprises a series of identical track segments, with each of the segments having a wheel or tire retaining flange depending from opposite ends thereof. Each flange has a pair of connecting lugs or tongues extending in one direction (e.g., in the direction of travel), with a single connecting lug extending in the opposite direction. Each lug or tongue pair is positioned to sandwich an opposing single lug or tongue therebetween from an adjacent track segment. Thus, each of the segments connects directly to another identical segment, with no intermediate connecting links being required. The interconnecting lugs or tongues extend straight from their respective flanges with no lateral offset, thus precluding any bending loads upon the lugs and producing a pure shear force across each connecting bolt or pin. The lugs or tongues are preferably hardened for greater durability, with the assembly including bushings for greater bearing area. The connecting pins are preferably threaded bolts secured in place by cooperating nuts. The cleats of the present track segments are configured to provide a self cleaning action when the vehicle is in motion, with the facing cleat extensions of each track segment capturing mud and other debris therebetween to act as a shoe or pad, thus reducing wear of the present track assembly.

20 Claims, 3 Drawing Sheets

TRACK ASSEMBLY FOR A WHEELED VEHICLE

BACKGROUND OF THE INVENTION

1. Field of the Invention

The present invention relates generally to endless track mechanisms for motorized vehicles, and more specifically to a track assembly for removable installation about the road wheels of a wheeled vehicle. The present track assembly is particularly well adapted for removable installation about the existing pneumatic tires of a relatively small skip loader and end loader type machinery and equipment (e.g., "Bobcat"™, vehicles) and provides the traction benefits of tracked type vehicles for such machinery.

2. Description of the Related Art

Relatively small and light utility vehicles such as small end loaders, skip loaders, and the like are conventionally equipped with four pneumatic tires for traction, with many utilizing differential braking for steering control. The fact that all of the wheels remain in alignment at all times due to their inability to change direction for steering, provides a basis for the addition of some form of endless track or belt about the wheels on each side of the vehicle to provide improved traction and flotation over loose and/or soft surfaces.

The above described concept has been implemented generally in the past, as exemplified by various earlier patent publications discussed further below. However, the efforts made in the past to produce a practicable track system for such wheeled vehicles have been less than totally satisfactory for various reasons, as noted further below.

Accordingly a need will be seen for a track assembly for wheeled vehicles, with the present track assembly providing removable installation on the road wheels of various types of skid steering type utility machines. The present track assembly comprises a plurality of identical links or segments, with each segment having a pair of connecting tongues or lugs extending in one direction from each end thereof and a single connecting tongue or lug extending in the opposite direction from each end of each link. The single tongues are each aligned with the gap between the opposed two tongues of an adjacent link, with a single bolt or pin being installed through the mating tongues at each end of the links to assemble the identical links. The present system provides greatly improved simplicity and efficiency over other removably installable track systems which require separate connecting clevises or other links between each of the track segments or links, as well as providing other benefits.

A discussion of the related art of which the present inventor is aware, and its differences and distinctions from the present invention, is provided below.

U.S. Pat. No. 2,726,904 issued on Dec. 13, 1955 to Mieczyslaw G. Bekker, titled "Endless Track," describes a relatively light weight track system comprising two different types of track sections or links alternately secured together, unlike the single type of link of the present invention which may be assembled with identical links to form a length of track. Also, the Bekker track links have depressed central sections which are engaged by the sprocket wheels of a tracked type vehicle (e.g., Caterpillar™—type tractor, etc.) and which ride in the center depression of the idler or "buggy" (bogy) wheels of such a machine. This arrangement is unsuitable for use with a vehicle having road wheels, as the central sections would ride over the raised center areas of the tires and would immediately slip laterally from the tires, as no lateral retaining means is provided by Bekker.

U.S. Pat. No. 4,089,565 issued on May 16, 1978 to George A. Loegering et al., titled "Removable Track Structure For Wheeled Vehicles," describes a track assembly comprising a series of identical individual links or sections. The links include depending end portions which serve to surround the sides of the tires partially in order to preclude slippage of the track assembly from the wheels. In one embodiment, each section has a lug extending from each end portion thereof which is captured between cooperating flanges of the end portion of the adjacent segment. The connecting pin is thus aligned generally with the track segment, making it difficult to access the end of the connecting pin to drive it out of the mating lug and flanges. In another embodiment, the two closely spaced end flanges extend to one side of the end portion, with the outer one of the two also extending forwardly and offset to fit between the two end flanges of the adjacent track segment. While this positions the connecting pins between each track segment for ease of access to the inboard end of the pin, the offset configuration of the single flange or lug results in asymmetrical bending forces being developed in the joint in addition to the shear forces across the connecting pin. Moreover, it is noted that Loegering et al. do not disclose any means of retaining the connecting pins in the mating flanges and lugs of their track segments; it would appear that these pins could work loose. In contrast, the present track assembly provides means for positively securing the pins through the mating tongues of adjacent track sections or links. Moreover, the mating extensions or tongues for connecting track segments of the present invention together are straight with no lateral offsets, thus providing pure shear forces across the connecting pins, unlike Loegering et al.

U.S. Pat. No. 4,176,887 issued on Dec. 4, 1979 to Gunther Alpers et al., titled "Endless Track Traveling Mechanism," describes a track assembly for use with conventional tracked vehicles having sprocketed drive wheels and bogy or idler wheels. As the track segments each include depending portions for engaging the protruding teeth of the sprocket wheels, the Alpers et al. track is more closely related to the track of the Bekker '904 U.S. Patent discussed further above than to the present track assembly; the Alpers et al. track cannot be applied to a wheeled vehicle.

U.S. Pat. No. 5,058,963 issued on Oct. 22, 1991 to Hagen H. Wiesner et al., titled "Belt-Type Caterpillar For Track-Laying Vehicles And Snowmobiles," describes a track assembly in which each track segment includes a plurality of resilient lugs and opposed teeth which are connected together by resilient belts. The belts include looped ends with lateral passages for installing lateral connecting bolts or pins therethrough. The teeth depend from the track towards the drive wheels and engage the wheels of the vehicle to maintain the alignment of the track on the wheels. Passages are also provided through the track to engage the teeth of the drive wheels. Thus, the Wiesner et al. track assembly is more closely related to the track assemblies of the Bekker '904 and Alpers et al. '887 U.S. Patents discussed further above, than to the present track assembly for removable installation on a wheeled vehicle.

U.S. Pat. No. 5,284,387 issued on Feb. 8, 1994 to George A. Loegering, titled "Removable Flexible Track Belt And Track Section Therefore (sic)," describes a track assembly having depending end flange portions for extending partially about the sides of the tires of a wheeled vehicle. All of the segments of the track assembly are identical to one another. However, each of the flanges includes a pair of lugs extending in opposite directions therefrom, with this symmetrical configuration precluding the direct attachment of adjacent segments to one another, as provided by the present track assembly. Loegering requires intermediate connecting links to join his track segments, thus adding to the number of parts and complexity of the assembly.

U.S. Pat. No. 5,616,193 issued on Apr. 1, 1997 to Erik G. S. Nordstrom et al., titled "Pneumatic Tires With Cooperating Track," describes in general a track assembly which may be applied to the pneumatic tires of a wheeled vehicle. However, the disclosure is primarily directed to a provision for internally supporting a deflated tire without undue wear thereto, including certain rubber compounds providing suitable durability for the deflated tire. Nordstrom et al. do not disclose any specifics relating to the track segment connecting means or other details of such a track assembly.

Finally, U.S. Pat. No. 5,951,124 issued on Sep. 14, 1999 to Ronald J. Hoffart, titled "Self-Cleaning Track," describes a track configuration similar to that of the identical, symmetrical track segments of the Loegering '387 U.S. Patent discussed further above, requiring the installation of intermediate links between each track segment for the assembly of the track. While Hoffart provides other distinctions over the track configuration of the '387 Loegering U.S. Patent, the requirement for a multitude of intermediate links for assembling his track segments to form a complete track assembly, results in a relatively complex assembly with considerably more parts than the track assembly of the present invention, with the present invention providing further benefits as well.

None of the above inventions and patents, taken either singly or in combination, is seen to describe the instant invention as claimed.

SUMMARY OF THE INVENTION

The present invention comprises a track assembly for removable installation to a wheeled vehicle, for increasing the traction and flotation of such a vehicle over rough, slippery and soft surfaces. The present assembly comprises a series of identical longitudinally asymmetrical track links or segments, with each segment having opposite laterally depending ends for passing about the sidewalls of the vehicle tires and retaining the track assembly on the vehicle. Each depending end has a pair of lugs or tongues extending in one direction therefrom, and a single tongue extending in the opposite direction. The double tongues are spaced to sandwich a mating single tongue from an adjacent track segment therebetween, with a single bolt or pin being installed through each of the cooperating tongue assemblies to secure the track segments together. The alignment of the tongues with no lateral offset produces pure shear forces in the connecting pins for a stronger connection. The present track assembly provides further advantages as well, with the configuration of the cleats providing a self cleaning action between track segments and also serving to capture dirt, mud, and debris between adjacent cleat faces of a single track segment for greater traction and also providing a cushion of such dirt and mud for reducing wear upon the cleats.

Accordingly, it is a principal object of the invention to provide an improved track assembly for a wheeled vehicle, with the track assembly providing for removable installation about the tires of the vehicle as desired.

It is another object of the invention to provide an improved track assembly comprising a plurality of identical asymmetrical track segments, each of the segments having a pair of laterally opposed retaining flanges depending therefrom, each of the flanges having a pair of spaced apart tongues extending in one direction therefrom and a single tongue extending in the opposite direction, with the first two tongues spaced to capture a single tongue of an adjacent track segment therebetween and joined by a single bolt or pin, and with cooperating tongues having no lateral offset, thereby producing pure shear forces in the connecting pins.

It is a further object of the invention to provide an improved track assembly in which the track segments include cleats extending therefrom, with their configuration providing a self cleaning action between track segments and also serving to capture mud and debris between the cleat faces of a single track segment for increased traction and reduced track wear.

An additional object of the invention is to provide an improved track assembly in which the connecting tongues are hardened and include at least one bushing therein for greater durability and reduced wear.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a track assembly for wheeled vehicles, for distributing their weight and tractive force over a larger area for greater traction and flotation over soft and low friction surfaces. The present track assembly is particularly well adapted for skid steer type vehicles (e.g. skid loaders, "Bobcats"™, etc.) which have the directional alignment of their wheels fixed, with directional control provided by differential braking.

Figure 1:
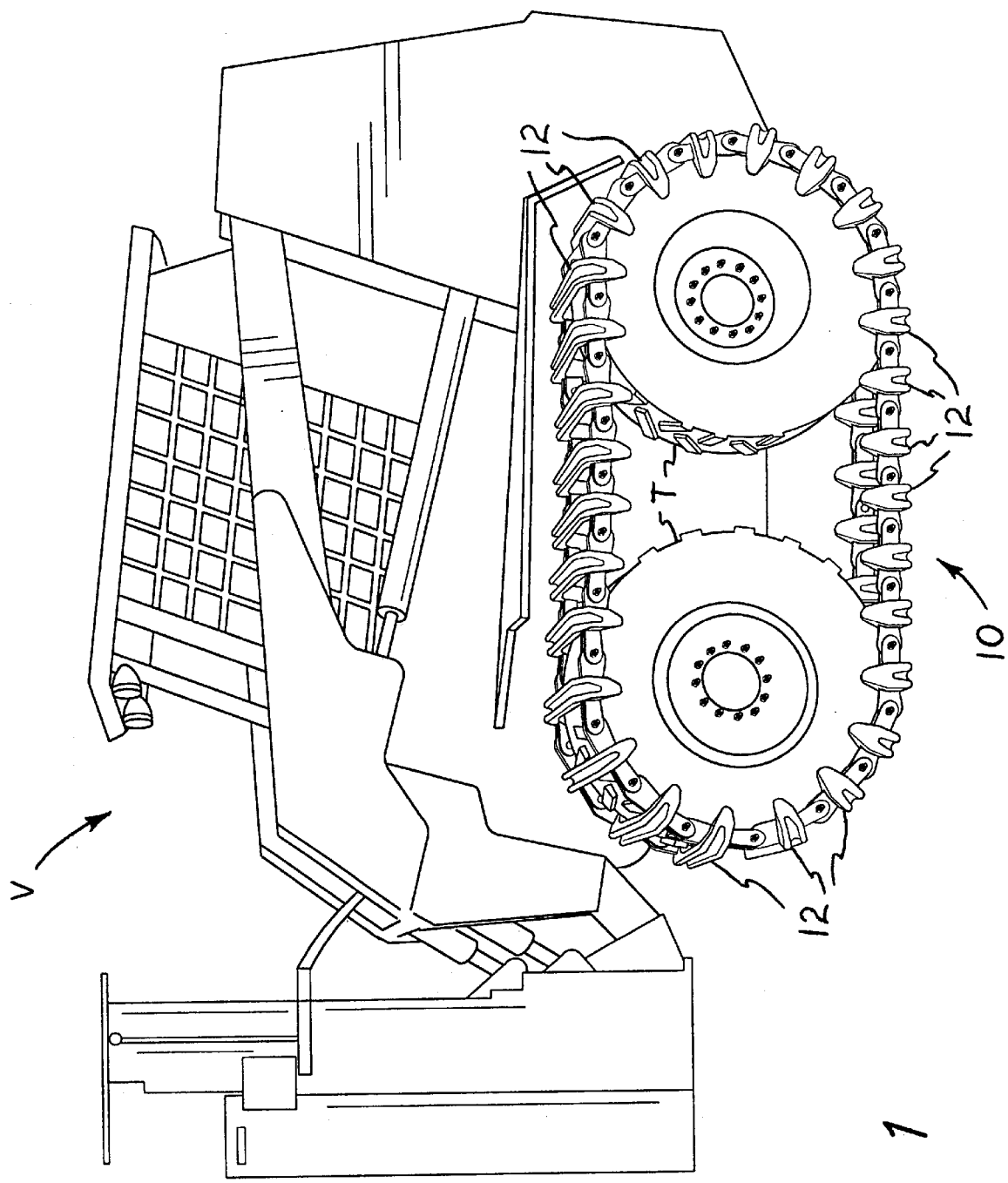
FIG. 1 is an environmental perspective view showing a plurality of track segments comprising the present track assembly installed upon the wheels and tires of a wheeled vehicle.

FIG. 1 illustrates an exemplary installation of the present track assembly 10 upon the left side tires T of a skid steer vehicle V. The track assembly 10 comprises a series of continuously linked or interconnected identical track segments 12, with the segments 12 forming a closed track assembly loop 10 disposed about the tires T to each side of the vehicle V.

Figure 2:
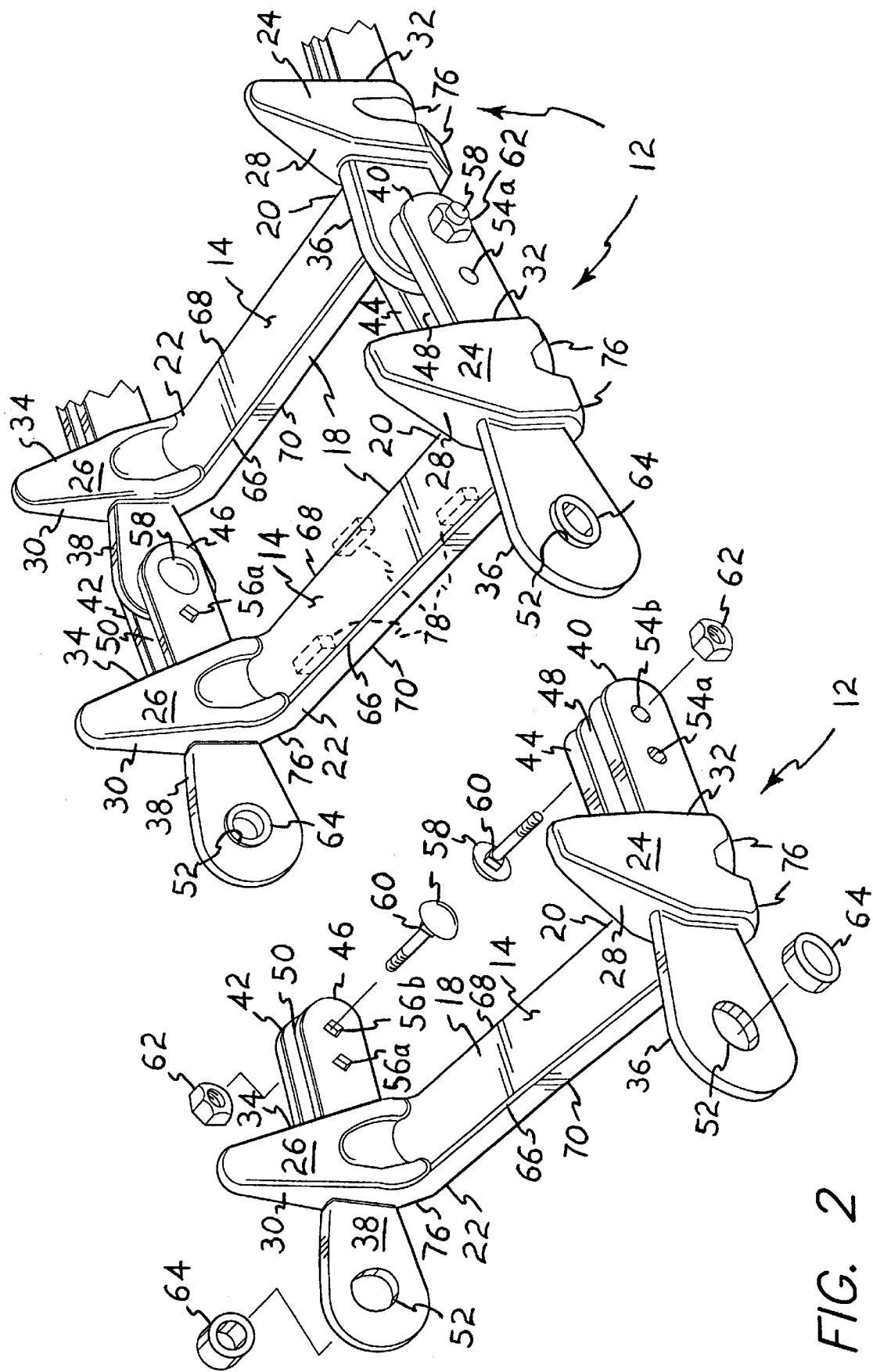
FIG. 2 is an exploded perspective view of the underside or wheel contact side of a plurality of the present track segments, showing details and assembly thereof.
Figure 3:
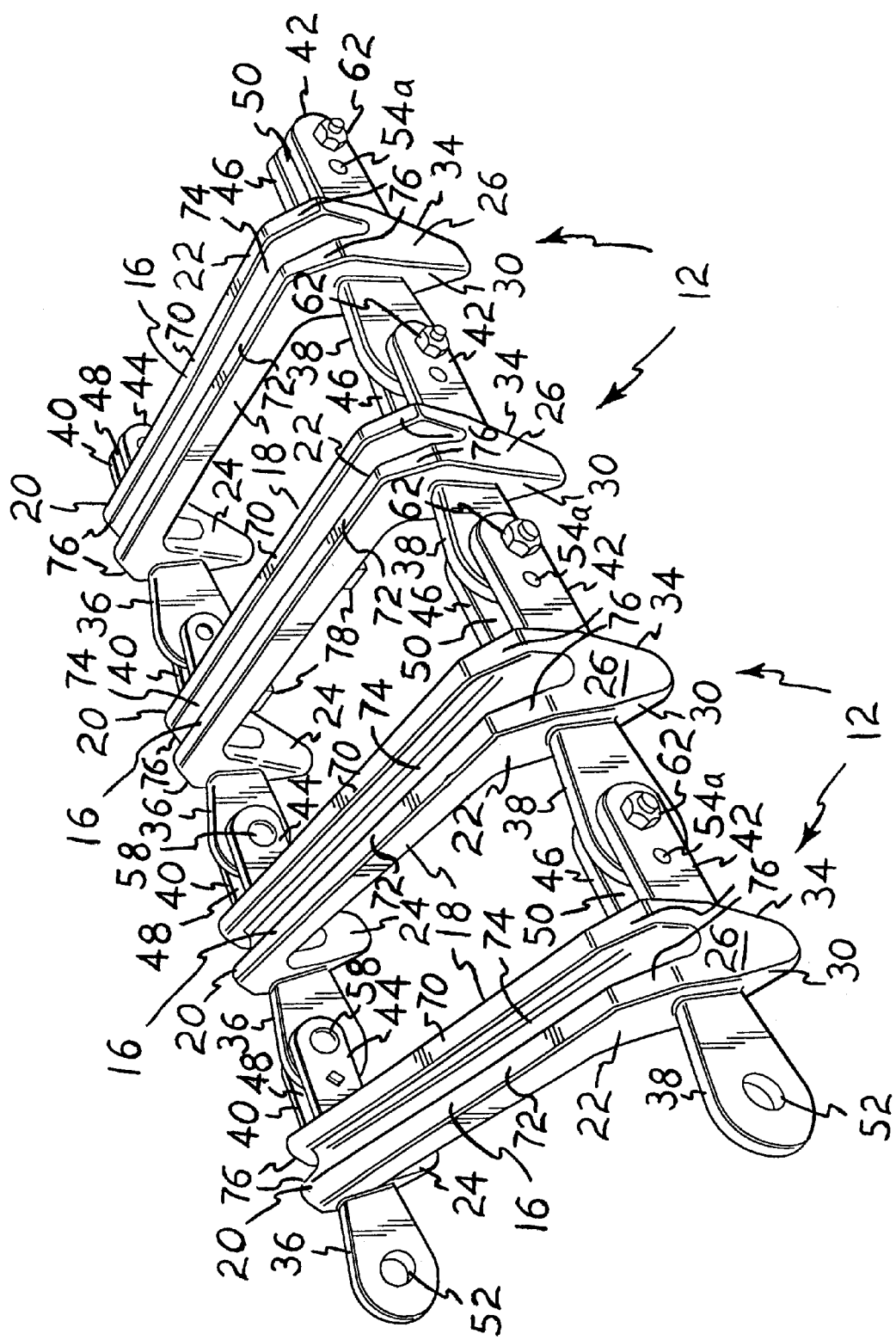
FIG. 3 is a perspective view of the outer side of an assembly of the present track segments, showing further details.

FIGS. 2 and 3 provide more detailed illustrations respectively of the underside or tire contact side 14 and outer or surface contact side 16 of a series of track segments 12, with the following detailed description of the identical track segments 12 referring to both FIG. 2 and FIG. 3 according to the orientation of the Figure and referenced component. The present track segments 12 are preferably formed of a durable material such as ductile cast iron, or other suitable material and manufacturing technique as desired. Certain components, such as the interconnecting tongue components which secure adjacent segments 12 together as discussed further below, may be hardened (e.g., induction hardening, etc.) for further durability, as desired.

Each track segment 12 includes a single laterally extending cleat portion 18 which generally defines the width of the track segments 12. The opposite first and second ends of each cleat 18, respectively 20 and 22, have a first and a second retaining flange, respectively 24 and 26, depending therefrom generally normal to the cleat portion 18, or radially inwardly with respect to the wheels of the vehicle when a track assembly 10 formed of identical track segments 12 is installed thereon. (The first and second cleat ends and flanges are opposite one another in FIGS. 2 and 3, due to the relative inversion of the track segments 12 in those two Figures.) The retaining flanges 24 and 26 serve to retain the track assembly 10 about the wheels and tires T of the vehicle V.

Each flange 24 and 26 has a first edge, respectively 28 and 30, and an opposite second edge, respectively 32 and 34. (The first and second edges 28 and 32 of the first flanges 24 are not indicated in FIG. 3, for clarity in the drawing Figure.) The first edges 28 and 30 of the two flanges each have a single first track segment interconnecting tongue, respectively 36 and 38, extending therefrom, while the opposite second edges 32 and 34 of the flanges each have second and third track segment interconnecting tongues extending therefrom. The second tongues, respectively 40 and 42, are disposed outwardly of the corresponding first tongues 36 and 38, while the third tongues, respectively 44 and 46, are positioned just inboard of the corresponding first tongues 36 and 38 when the track segments 12 are assembled.

The second and third tongues define slots 48 and 50 therebetween, with the width of the slots 48 and 50 providing just enough space for the installation of the corresponding first interconnecting tongues 36 and 38 therein. The second and third tongues 40 and 44 sandwich corresponding first tongues 36 therebetween, and the opposite second and third tongues 42 and 46 sandwich the corresponding opposite first tongues 38 therebetween when the track segments 12 are assembled. All of the tongues 36 through 46 are flat and straight, and extend straight out from their respective retaining flanges with no lateral offset. This precludes the imposition of any bending forces in any of the tongues 36 through 46 and produces pure shear forces upon the connecting bolts or pins, thus providing stronger connections.

The first tongues 36 and 38 each have a single interconnecting pin passage 52 formed therethrough, with the second and third tongues 40 through 46 each having at least one interconnecting pin passage therethrough. Preferably, first and second outer passages, respectively 54a and 54b, are formed through each of the outer or second tongues 40 and 42, with first and second inner passages, respectively 56a and 56b, being formed through the inner or third tongues 44 and 46. The first and second outer passages 54a and 54b, and the first and second inner passages 56a and 56b are respectively concentric with one another, with the first passages 54a and 56a being located closer to the second edges 32 and 34 of the flanges 24 and 26. In this manner, the length of the present track assembly 10 may be adjusted by aligning either the first passages 54a and 56a, or the second passages 54b and 56b, with the passage 52 of the corresponding first tongue 36, 38. Considerable adjustment is provided when the number of track segments 12 required to form a complete track assembly 10 is considered.

The track segment interconnecting pins 58 preferably comprise carriage bolts with square shoulders 60 immediately adjacent the heads. The innermost passages 56a and 56b are formed (broached, etc.) as square holes to fit the square shoulders 60 of the carriage bolts 58 and preclude their turning within the passages of the second and third tongues 40 through 46. This positions the round heads of the bolts 58 adjacent the tire sidewalls, thus precluding any damage thereto which might otherwise occur if the edges of the mating nuts or bolt ends were to bear against the tires.

The bolts or pins 58 may be retained through their respective passages by means of cooperatingly threaded nuts 62 secured to the outboard ends of the bolts 58, adjacent the second tongues 40 and 42. Some form of lock nut (e.g., elastic insert stop nuts, etc.) are preferably used in order to preclude the assembly from loosening during operation. However, as the interconnecting pins or bolts 58 do not rotate relative to the second and third tongues 40 through 46, it will be seen that no relative rotation is imparted to the nuts 62. All relative rotation of the interconnecting assembly involves the first tongues 36 and 38 rotating between their respective second and third tongues 40 through 46. Accordingly, the pin passages 52 of the first tongues 36 and 36 are preferably somewhat larger than the diameter of the bolts or pins 58, with bushings 64 being installed within the first tongue passages 52 in order to absorb the rotational forces when the track assembly 10 is in operation.

The cleat portions 18 of the track segments 12 are preferably configured as a generally flat bar with opposite first and second edges 66 and 68. Each edge 66, 68 has a cleat ridge, respectively 70 and 72, extending therefrom. The ridges 70 and 72 extend generally radially outwardly from the tires T of the vehicle V when the track assembly 10 is installed thereto, to provide improved traction for the vehicle V. The two opposed cleat ridges 70 and 72 define a debris capture channel 74 therebetween, which serves to capture mud, dirt, and other debris therein. The captured debris acts as a track pad to reduce wear of the cleat ridges 70 and 72.

Each of the ends 20 and 22 of the transverse cleat bars 18 preferably includes a chamfered or beveled corner 76 to smooth the operation of the present track assembly, particularly while the vehicle V is changing direction. The beveled corners 76 allow the track segments 12 to move somewhat laterally during turning operations, to facilitate the turning of the vehicle V.

As no positive engagement between the tire tread and track assembly 12 is provided, as is the case with vehicles originally constructed with tracks driven by toothed drive wheels, the present track segments may include additional grip means disposed along the inner tire contacting surface 14 of the cleats 18. These raised tire grips 78 extend inwardly (i.e., toward the tire as the track assembly 12 travels therearound during operation), with the tire tread gripping the raised grips 78 to preclude slippage of the tire tread relative to the track assembly 10 during operation. These tire grip blocks 78 are an alternative, optional feature not required for the present track segments assembly, and thus are shown in broken lines on one of the track segments 12 in FIG. 2.

In summary, the present track segments 12 and assembly 10 formed therefrom provide a significant improvement in strength, durability, traction, and other desirable qualities of such devices for wheeled vehicles. The cast iron manufacture of the present track segments provides a reasonably economical manufacturing means, while also providing an extremely durable product. Areas of high stress, such as the interconnecting tongues, may be hardened for additional strength and durability.

The flat and straight configuration of the first through third interconnecting tongues, extending straight from their respective flange sides and devoid of any lateral or other bends therein, absolutely preclude any bending stresses in these components to provide even further strength. This is one of the most highly stressed areas of a track assembly, due to the tension which must be applied to the assembly to secure it tightly about the vehicle wheels to preclude slippage therearound. The tensile forces will also produce a straightening force upon any interconnecting tongues with bends formed therein, thus resulting in at least some bending force being applied to both the interconnecting tongues and the pin connecting the tongues. The pure shear forces provided by the present straight interconnecting tongues, greatly reduces the total stresses on the interconnecting bolts and the tongues themselves, resulting in further improvements in durability and strength.

The provision of bushings in the single tongues which have rotary motion about the interconnecting bolts or pins, also serves to reduce wear and tear in the present track assembly. The result of the various improvements described herein, is a much more durable and stronger track assembly which is particularly suitable for use with wheeled skid steer type vehicles, and which will provide greatly improved strength, durability, and economy in comparison to other such track assemblies of the prior art.

It is to be understood that the present invention is not limited to the sole embodiment described above, but encompasses any and all embodiments within the scope of the following claims.

I claim:

1. A track assembly for a wheeled vehicle, comprising:
    a plurality of endlessly interconnected identical track segments forming a closed track loop;
    each of said track segments comprising a single lateral cleat portion with a first end and a second end opposite said first end;
    a first and a second retaining flange depending radially inwardly with respect to the wheels of the wheeled vehicle, from each said end of each said cleat portion;
    each said retaining flange having a first edge and a second edge opposite said first edge;
    a straight, flat first track segment interconnecting tongue devoid of lateral offset extending from said first edge of each said retaining flange;
    straight, flat second and third track segment interconnecting tongues each devoid of lateral offset extending from said second edge of each said retaining flange;
    said first through said third tongues each including at least one interconnecting pin passage formed therethrough;
    said second and said third tongues sandwiching a corresponding said first tongue of an adjacent one of said track segments therebetween; and
    said first through said third tongues each including a connecting pin removably installed through each corresponding said pin passage for removably connecting said track segments directly together.

2. The track assembly according to claim 1, wherein said third tongue is positioned inwardly from said first and said second tongues with respect to a corresponding said retaining flange;
    said pin passage of said third tongue is a square hole; and
    said connecting pin comprises a carriage bolt with a square shoulder for engaging said square pin passage hole of said third tongue for precluding rotation of said connecting pin relative to said second and said third tongues.

3. The track assembly according to claim 2, including a mating nut removably threaded to each said carriage bolt and disposed adjacent said second tongue of each said retaining flange.

4. The track assembly according to claim 1, including a bushing disposed in said pin passage of said first tongue of each of said track segments.

5. The track assembly according to claim 1, wherein said first through said third tongues are hardened.

6. The track assembly according to claim 1, wherein each said cleat portion comprises a flat bar having a first edge and a second edge opposite said first edge, with each said edge respectively having a first and a second cleat ridge extending generally radially outwardly with respect to the wheels of the wheeled vehicle from said bar.

7. The track assembly according to claim 6, wherein each said cleat portion defines a lateral debris capture channel for capturing debris therein, for serving as a track pad for each of said track segments and precluding excessive wear thereof.

8. The track assembly according to claim 6, wherein each said cleat has chamfered opposite first and second ends.

9. The track assembly according to claim 1, wherein said cleat portion of each of said track segments has a tire contacting surface including a plurality of raised tire grips extending therefrom.

10. The track assembly according to claim 1, wherein each of said track segments is cast iron.

11. A track segment for use in forming a track for a wheeled vehicle, comprising:
    a single lateral cleat portion with a first end and a second end opposite said first end;
    a first and a second retaining flange depending radially inwardly with respect to the wheels of the wheeled vehicle, from each said end of each said cleat portion;
    each said retaining flange having a first edge and a second edge opposite said first edge;
    a straight, flat first track segment interconnecting tongue devoid of lateral offset extending from said first edge of each said retaining flange;
    straight, flat second and third track segment interconnecting tongues each devoid of lateral offset extending from said second edge of each said retaining flange; and
    said first through said third tongues each including at least one interconnecting pin passage formed therethrough.

12. The track segment according to claim 11, wherein said third tongue is positioned inwardly from said first and said second tongues with respect to a corresponding said retaining flange;
    said pin passage of said third tongue is a square hole; and
    a connecting pin comprising a carriage bolt with a square shoulder for engaging said square pin passage hole of said third tongue for precluding rotation of said connecting pin relative to said second and said third tongues of each said retaining flange.

13. The track segment according to claim 12, including a mating nut removably threaded to each said carriage bolt and disposed adjacent said second tongue of each said retaining flange.

14. The track segment according to claim 11, including a bushing disposed in said pin passage of said first tongue of each said retaining flange.

15. The track segment according to claim 11, wherein said first through said third tongues are hardened.

16. The track segment according to claim 11, wherein said cleat portion comprises a flat bar having a first edge and a second edge opposite said first edge, with each said edge respectively having a first and a second cleat ridge extending generally radially outwardly with respect to the wheels of the wheeled vehicle from said bar.

17. The track segment according to claim 16, wherein said cleat portion defines a lateral debris capture channel for capturing debris therein, for serving as a track pad for said track segment and precluding excessive wear thereof.

18. The track segment according to claim 16, wherein said cleat has chamfered opposite first and second ends.

19. The track segment according to claim 11, wherein said cleat portion of said track segment has a tire contacting surface including a plurality of raised tire grips extending therefrom.

20. The track segment according to claim 11, wherein said track segment is cast iron.

* * * * *